United States Patent
Jones

(10) Patent No.: US 11,464,239 B2
(45) Date of Patent: Oct. 11, 2022

(54) COMPOSITION AND METHOD OF MAKING PLANT-BASED FOOD PRODUCTS

(71) Applicant: Thrilling Foods, Inc., Portland, OR (US)

(72) Inventor: David Jones, Portland, OR (US)

(73) Assignee: Thrilling Foods, Inc.

( * ) Notice: Subject to any disclaimer, the term of this patent is extended or adjusted under 35 U.S.C. 154(b) by 0 days.

(21) Appl. No.: 17/456,350

(22) Filed: Nov. 23, 2021

(65) Prior Publication Data

US 2022/0159986 A1  May 26, 2022

Related U.S. Application Data

(60) Provisional application No. 63/118,453, filed on Nov. 25, 2020.

(51) Int. Cl.
| | |
|---|---|
| A23J 3/16 | (2006.01) |
| A23C 20/02 | (2021.01) |
| A23J 3/22 | (2006.01) |
| A23J 3/26 | (2006.01) |

(52) U.S. Cl.
CPC .............. *A23C 20/025* (2013.01); *A23J 3/16* (2013.01); *A23J 3/227* (2013.01); *A23J 3/26* (2013.01)

(58) Field of Classification Search
CPC . A23V 2002/00; A23J 3/16; A23J 1/14; A23J 3/14; A23J 3/00; A23C 11/103; A23C 20/025; A23C 11/106; A23C 20/005; A23C 11/06; A23C 2270/05; A23L 5/00; A23L 25/00; A23L 11/05; A23L 11/45; A23L 11/50; A23L 11/40; A23L 1/27; A23P 20/20; A23D 5/00
See application file for complete search history.

(56) References Cited

U.S. PATENT DOCUMENTS

| | | | |
|---|---|---|---|
| 3,840,677 A | 10/1974 | Leidy et al. | |
| 4,200,959 A | 5/1980 | Cheney | |
| 4,902,526 A * | 2/1990 | Sudo .................... | A23C 11/103 426/598 |
| 9,808,029 B2 | 11/2017 | Fraser et al. | |
| 10,039,306 B2 | 8/2018 | Vrljic et al. | |
| 10,327,464 B2 | 6/2019 | Fraser et al. | |
| 2004/0197463 A1 | 10/2004 | Gottemoller | |
| 2007/0269571 A1 | 11/2007 | Akita et al. | |
| 2015/0296834 A1 | 10/2015 | Geistlinger | |

FOREIGN PATENT DOCUMENTS

| | | | | |
|---|---|---|---|---|
| JP | 2001292719 | * 10/2001 | ............... | A23L 1/20 |
| WO | WO 2013/010042 | 1/2013 | | |
| WO | WO 2014/110539 | 7/2014 | | |
| WO | WO 2015/153666 | 10/2015 | | |
| WO | WO 2015/161099 | 10/2015 | | |

OTHER PUBLICATIONS

JP 2001292719A, Patent Translate, machine English translate, Oct. 23, 2001 (Year: 2001).*

* cited by examiner

*Primary Examiner* — Hong T Yoo
(74) *Attorney, Agent, or Firm* — Knobbe, Martens, Olson & Bear, LLP

(57) ABSTRACT

Tofu products and methods of making the same. The tofu products may include one or more layers. A first layer may include added fat, and a second layer may include no added fat. The fat may be introduced into the soymilk prior to curdling. The first and second layers may be layered to form a layered tofu product such as a bacon analog.

18 Claims, 14 Drawing Sheets

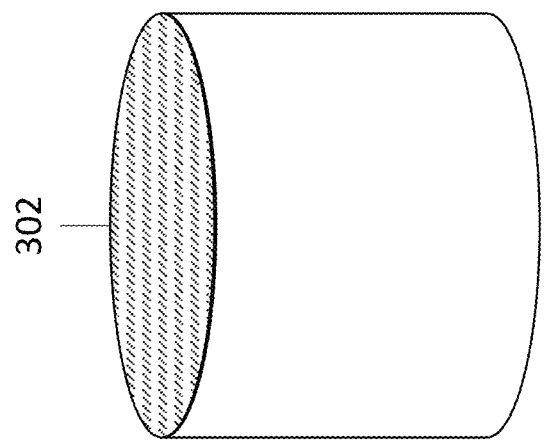
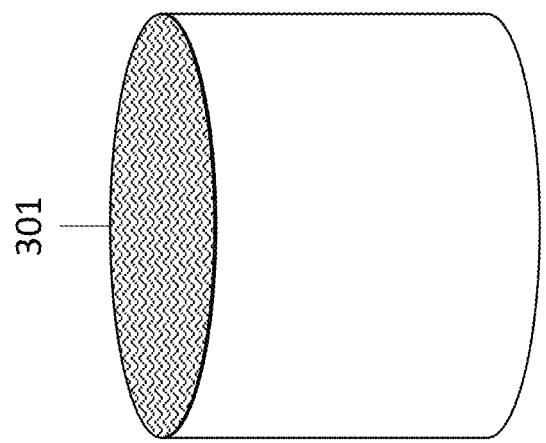
FIGURE 3

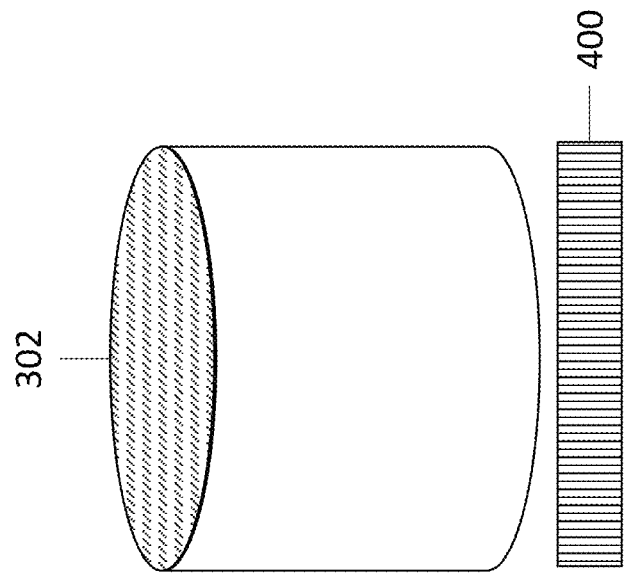
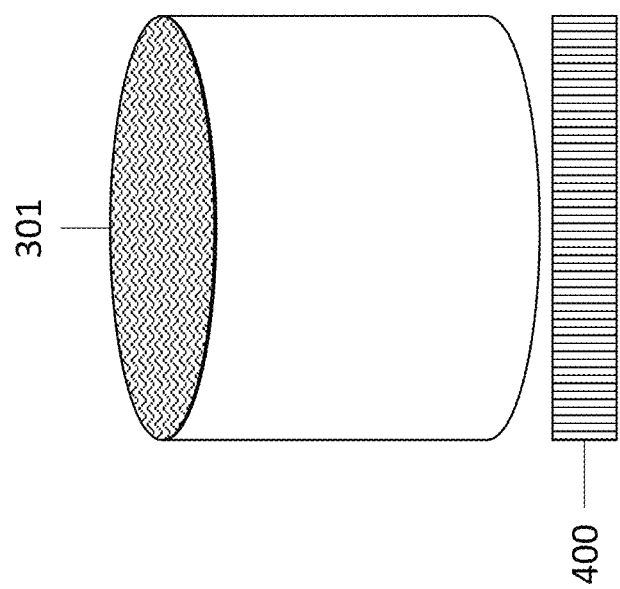
FIGURE 4

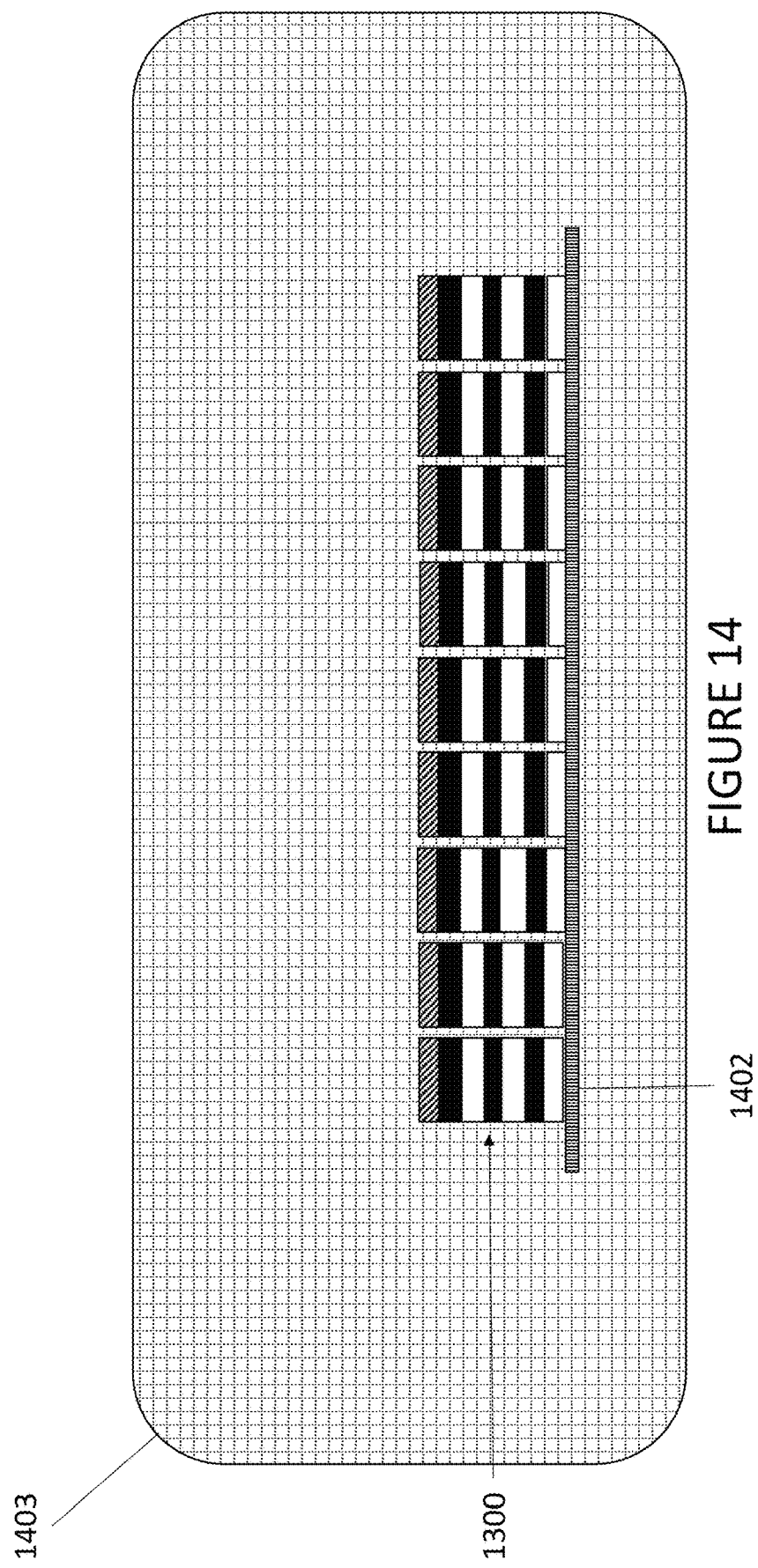

COMPOSITION AND METHOD OF MAKING PLANT-BASED FOOD PRODUCTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57.

This application claims priority benefit of U.S. Provisional Application No. 63/118,453, filed Nov. 25, 2020, which is hereby incorporated by reference in its entirety herein.

BACKGROUND

Field

The present disclosure relates to plant-based food products and processes for preparing food substitutes such as meat substitutes like bacon.

Description of the Related Art

Plant-based tofu has been a well-established and traditional part of many diets in Asia dating back thousands of years without any associated health issues. In fact, research has shown that where Asian populations have consumed a typical amount of dietary tofu, from three portions per week to regular daily consumption, a lessened incidence of cancer and other meat-eating related issues was found.

SUMMARY

The demand for plant-based foods has been growing globally for quite a few years and has only accelerated in recent years. Countless meat and dairy substitutes are being developed in a rapid response to this market demand. With U.S. consumption of pork bacon estimated at over 5 billion pounds a year, bacon is a prime target for a successful analog. Currently available bacon-like plant-based substitutes are made from a number of ingredients with varying commercial success and varying consumer perceptions of their success at substituting for pork bacon. Some substitutes utilize soybeans as a base, such as in sliced tempeh, or in products containing soy protein isolates or soy flour. Other products rely on wheat gluten, or even konjac fermented rice. There is no food product where the body of the analog is made of coagulated soymilk or curds. No commercial food provider has developed a tofu-based bacon analog.

While plant-based diets are often perceived as healthier than consuming red meat, hormonally and antibiotic fed animals, or even mercury laden fish, still health prejudices exist for a number of plant-sourced ingredients. Both soy and gluten have been implicated as ingredients of concern. Looking deeper, one reason that commercial producers may not have adopted a tofu-like product for creating meat analogs such as bacon is that tofu is fragile, and the production process is difficult compared to the typical industrial food production method of dumping ingredients into a churning mixer and forcing the output through extrusion dies.

Typical or traditional tofu is an interesting product in that it has been produced for centuries, and now all over the world, and yet innovation has not made much of an impact on the various forms of tofu available worldwide. You can search hundreds of stores and never find a novel tofu that even contains table salt to enhance flavor. A typical package of tofu has very little on the ingredient panel, and usually states: water, soybeans, and finally one of many coagulants used to affect final texture. While tofu can be found in many shapes and sizes and forms, such as blocks, knots or sheets, it rarely has a fourth ingredient.

While it is remarkable that tofu is still the same as it was hundreds of years ago, this stasis is understandable to anyone who has tried to change that recipe. Even making the traditional tofu alone can be difficult, and is often described as an art. The conditions required for the precipitation of bonded proteins from soymilk such that, when gathered in a cheesecloth and pressed, they can form a firm mass are fairly narrow, demanding that the milk protein chemistry and solids, the temperature, duration and coagulant makeup all be within strict parameters.

The present disclosure is directed to processes for incorporating additional ingredients into soy milk to form a finished, molded tofu that is a suitable food substitute, for example a bacon substitute having similar tastes and textures to traditional pork-based bacon. Certain aspects of the disclosure are directed toward multi-colored, multi-layered, multi-textured, smoked, salt-cured, and/or flavored tofu (see FIG. 1). The tofu-product may include added fats for richness. The added fats allow the tofu-based product to fry in its own fat, producing a look, texture, smell, taste and chew similar to traditional pork bacon and other similar products such as ham, and other hung and tinned meats, using whole foods like whole soy beans, while avoiding any animal-derived ingredients or any of the popular non-whole food ingredients found in many plant-based foods such as extracted wheat gluten and protein or plant "isolates". Other important health considerations include organic or non GMO ingredient sources, ingredient sustainability, and limiting the sheer number of additional ingredients.

The tofu-based product described herein may similar to traditional pork bacon, but also fry similarly. When placed into a skillet and heat, the tofu-based product can fry, sizzle and undulate like traditional bacon in its own fat. The tofu-based bacon product can be visually and aurally appealing due to the fact that its fries in its rendered fat as does traditional pork bacon. The tofu-based product can also produce the strong smell of traditional bacon frying.

Certain aspects of this disclosure are related to the homogenization of fats into the tofu. The homogenization of fats improves the taste of the tofu-based product and provides a sizzle effect when cooked in a pan. One drawback of introducing fat into tofu-based product is that the fat can separate back out of the tofu-based product. The processes described herein are designed to prevent fat from being expelled from the product with tofu-based products exhibiting at least about 10% and/or less than or equal to about 25% fat content, for example at least about 12%, at least about 15%, at least about 18%, or at least about 20%, or at least about 25% prior to cooking. To increase fat content, the fat and flavoring may be introduced into the soy milk prior to curdling. Temperature control during the process for making the tofu-based product can also improve homogenization of fats. For example, any of the heating steps described herein may be executed at a temperature of less than or equal to about 220° F. or less than or equal to about 200° F. The tofu-based product may be heated sufficiently long to reach an internal temperature of at least 165° F. At these levels, the temperature is sufficiently low to avoid rapid shrinkage or creation of pores that may result in loss of fat. The reduced temperature also prevents the outside of the tofu-based product from being dried out. A dried product may not withstand handling forces and crumble when sliced thinly or picked up. Using the methods described herein, the tofu-based product can be sliced to a thickness of less than or equal to about 5 mm.

Even with the high fat content, the tofu-based product has increased firmness and fewer pores compared to "extra firm" tofu on the market. In contrast to typical tofu processing methods that cool and package the tofu in water, the methods described herein continuously expel water from the tofu product. For example, pressure may be applied to the tofu-based product to extract water for at least one hour, at least eight hours, or at least twelve hours, depending on the amount of pressure, although in other methods pressure may be applied for less than an hour, less than 30 minutes, less than 10 minutes, or less than one minute. This is generally considered undesirable in current tofu manufacturing techniques because production would be held up for long durations. The pressure may be applied using weights, for example weights of at least 25 lbs. The pressure may be applied at temperatures of less than or equal to about 50° F., less than or equal to about 45° F., or less than or equal to about 40° F. Salt may also be applied to an exterior surface of the tofu product for at least one hour, at least eight hours, or at least twelve hours to expel additional water. After the tofu-based product has been prepared, the tofu-based product can be packaged dry without any additional liquid. The methods described herein lead to a lower moisture level that tofu on the market, for example less than or equal to about 75%, less than or equal to about 70%, less than or equal to about 65%, or less than or equal to about 60%.

Certain aspects of the disclosure relate to a process for making a layered tofu product. The method may include forming one or more layers of tofu product. In some methods, forming a first layer may include homogenizing a mixture of soy milk and fat prior to curdling. The first layer may be representative of the fat layer in a bacon analog and may include at least 12% by weight fat, at least 15% fat, or at least 18% fat, or at least 20% fat, or at least 25% fat. The method may also include forming a second layer of tofu product. The second layer may include soy milk and no added fat, representative of the lean layers in a bacon analog. The method may include layering one or more first and second layers to form the layered tofu product. Homogenizing the mixtures may include applying a shear force to the mixture.

Additional ingredients, for example yeast, salt, or other flavoring ingredients, may also be added prior to curdling to improve homogenization and improve flavor. This is in contrast to current tofu products on the market that simply marinate the tofu product in seasoning at the packaging phase. The marinades only provide flavor to the outer surface of the tofu product. In some methods, different flavoring ingredients may be applied to each layer of the food product, for example different yeasts or different flavors to create different flavor and color profiles depending on the food product being replicated.

As mentioned above, various techniques may be applied to improve fat content and lower moisture levels. For example, prior to baking, the layered tofu product may be vibrated to reduce pore size or the number of pores. The method may include applying pressure to the layered tofu product for at least one hour, at least six hours, or at least eight hours. Heat may be applied to the layered tofu product at one or more stages of the process at a temperature no more than 220° F., or no more than 200° F. For example, during a smoking stage, smoke may be applied indirectly to the layered food product at a temperature of less than or equal to 200° F. Salt may be applied to an external surface of the layered tofu product to expel additional moisture. The end product may be packaged without any additional water, marinade, or other fluid.

Certain aspects of the disclosure relate to an enriched and flavored layered tofu product. The tofu product may include a first layer having fat (e.g., palm oil fat), soy milk, yeast, salt, coagulant (e.g., citric acid), and/or sweetener (e.g., allulose). The first layer may contain no added food coloring. Each first layer may contain at least 10% by weight fat (or at least 12%, at least 15%, at least 18%, at least 20%, or at least 25%). The tofu product may include a second layer comprising soy milk, yeast, salt, coagulant, food coloring, and/or sweetener. The second layer contains no added fat. The moisture level of the layered tofu product may be no more than about 75%, no more than about 70%, no more than about 65%, or no more than about 60%. The yeast in the second layer may be a smoked yeast. The food coloring may be a natural food product such as paprika and/or radish to provide a red color. Two or more first layers and/or second layers may be stacked in alternating order to form a layered tofu product.

In one example, the first layer may include from 10% to 12% by weight fat (e.g., palm oil fat), from 0.8% to 2.0% by weight yeast, from 0.5% to 1.5% by weight salt, from 0.02% to 0.1% coagulant (e.g., citric acid), from 0.1% to 0.5% by weight sweetener (e.g., allulose), and/or from 85.9% to 88.6% by weight soy milk. The second layer may include from 0.5% to 1.5% by weight yeast, from 0.3% to 1.1% by weight salt, from 0.02% to 0.1% coagulant (e.g., citric acid), from 0.2% to 0.8% by weight food coloring, from 0.1% to 0.5% sweetener (e.g., allulose), and/or from 96.0% to 98.8% by weight soy milk.

Certain aspects of the disclosure relate to an enriched and flavored layered tofu product. The layered tofu product may include a first layer having fat (e.g., palm oil fat), soy milk, yeast, salt, coagulant (e.g., citric acid), and/or sweetener (e.g., allulose). For example, the first layer may contain at least 85% by weight soy milk. The layered tofu product may include second layer having soy milk, yeast, salt, coagulant (e.g., citric acid), food coloring, and/or sweetener (e.g., allulose). The second layer may contain more soymilk than the first layer and is at least 95% by weight soy milk. The moisture content of the layered tofu product may be no more than 75%, no more than 70%, no more than 65%, or no more than 60%. The yeast in the second layer may be a smoked yeast. The food coloring may be a natural food product such as paprika and/or radish to provide a red color. Two or more first layers and/or second layers may be stacked in alternating order to form a layered tofu product.

In one example, the first layer may include from 10% to 12% by weight fat (e.g., palm oil fat), from 0.8% to 2.0% by weight yeast, from 0.5% to 1.5% by weight salt, from 0.02% to 0.1% coagulant (e.g., citric acid), from 0.1% to 0.5% by weight sweetener (e.g., allulose), and/or from 85.9% to 88.6% by weight soy milk. The second layer may include from 0.5% to 1.5% by weight yeast, from 0.3% to 1.1% by weight salt, from 0.02% to 0.1% coagulant (e.g., citric acid), from 0.2% to 0.8% by weight food coloring, from 0.1% to 0.5% sweetener (e.g., allulose), and/or from 96.0% to 98.8% by weight soy milk.

Although certain examples are described herein with respect to a layered product, the methods may be used to provide a single layer product to make other food analogs. For example, the enriched and flavored tofu product may include a single layer having soy milk, fat, and one or more flavoring ingredients. The fat and flavoring ingredients may be homogenized into said soymilk prior to curd formation.

Any feature, structure, or step disclosed herein can be replaced with or combined with any other feature, structure, or step disclosed herein, or omitted. Further, for purposes of summarizing the disclosure, certain aspects, advantages, and features of the inventions have been described herein. It is to be understood that not necessarily any or all such advantages are achieved in accordance with any particular embodiment of the inventions disclosed herein. No individual aspects of this disclosure are essential or indispensable.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

FIG. 3 is a schematic representation of the addition of ingredients stage of creating the tofu-based product;

FIG. 4 is a schematic representation of the initial heating stage of creating the tofu-based product;

FIG. 14 is a schematic representation of the tofu-based product being smoked.

DETAILED DESCRIPTION

With bacon there are four predominate flavors: an umami flavor from pork, a fatty flavor, a saltiness, and a smoke flavor. Some varieties of bacon will also carry a sweetness from traditional sugar cures such as brown sugar or maple syrup. But the protein bonds of commercially available tofu can be difficult to penetrate with coloring and flavoring agents. Tofu is generally resistant to taking on fats, sugars, flavors or colors. The compositions and processes described herein include chemical ingredients that can be added as flavorings without detrimentally affecting the soy-milk curdling process.

Figure 1:
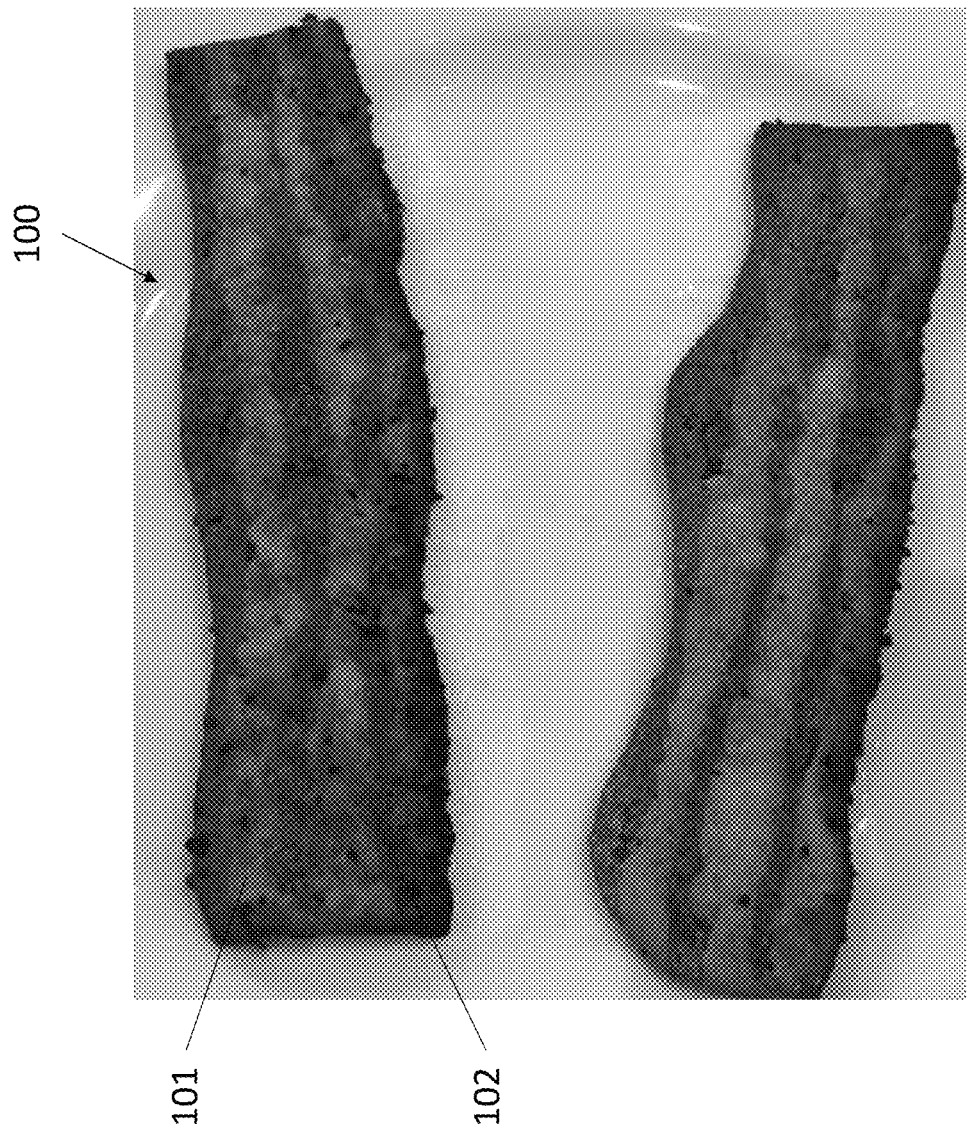
FIG. 1 is a photograph of the tofu-based bacon product.

The tofu-based product 100 described herein, shown in FIG. 1, may include sufficient fat content to cook in its own fat and simulate pork-based bacon. For example, the tofu-based product 100 can be made with at least 12% to 25% fat in raw form or after cooking, for example at least 15%, at least 18%, at least 20%, or at least 25%. The fat can be introduced into tofu by homogenizing melted solid fat into soy milk, while still being able to coagulate the soymilk into a tofu-like mass. Although certain methods described herein use palm oil, other fats may be used, for example coconut fat. It can be difficult to introduce fat into the tofu structure because the fat tends to inhibit the protein bond structure of the tofu. The fat can be introduced by applying a sufficient shear force to the fat and soy milk under heat. Tofu made from the high fat soy milk may produce a softer yet crispy product when frying, yet a low fat tofu when fried became very chewy. The processes described herein provide far greater levels of fat than the 3% to 4% fat level available in commercially available tofu. Because commercially available tofu has such low fat content, the tofu product cannot fry in its own fat, or ever have an unctuous fat-supplied flavor or texture.

Introducing fat into the tofu product can be difficult because the tofu product may become less durable and may fall apart. Alternating layers of tofu product without added fat and layers of tofu product with added fat can provide sufficient structural integrity for the tofu-based bacon product. Due to the decreased protein bonds, the alternating layers provide a multi-textured and/or multi-flavored character that can mimic the fatter and leaner layers of pork-based bacon. Different layers of the tofu-based bacon product may have different formulations. The tofu-based bacon product may provide those contrasting textures and flavors by keeping the fat and fat flavors all in the fat portion of tofu-based bacon product and keeping the meatier deeper flavors all in a chewier denser lean portion. In some implementations, the different layers of the tofu-based bacon product may include different types of yeast to provide different textures. Quite like traditional pork bacon, as the consumer chews, the fattier part dissolves under mastication a bit more quickly, sending a warm fatty sensation around in the mouth, while the chewier lean part breaks up into smaller and smaller yet detectable separate pieces.

As mentioned above, one of the difficulties with tofu-based product 100 involves making it sliceable. Naturally occurring syneresis in protein or starch laden foods is a process wherein the bonds produced between starches or proteins will continue to tighten over a period of time, forcing out liquids. This process which can be eventually observed as a separation of liquid from the gel. Tighter protein bonding with less whey bound up between bonds yields a firmer and more durable product cake and slice, better able to resist the damage inflicted by shearing forces that occur during usual handling both during production and by the consumer. The methods described herein continue syneresis beyond what is naturally occurring. After the period of natural syneresis fully occurs, additional heat and pressure can be applied, forcing the proteins bonds to tighten further and expel more whey than a traditional extra firm tofu block. Under certain conditions, this additional syneresis can take place without extracting the precious fats that are held within the proteins in the same manner, and without causing large pores to develop in the tofu block due to heat. If pressure or temperature is too high, fats will be lost, pores will enlarge, and the product will be inferior.

Typical tofu has what are called "pores" in a sliced face of a traditional tofu block. Upon slicing traditional tofu as thin as 5 mm, the strip will almost always break upon handling that does not fully support the strip, or allowing it to bend to break point. Reduced pore sizes would strengthen the thin strips for better handling. In addition, the absence of pores would provide a strip that looked more like traditional pork bacon since no pores are present in pork. The pores are a product of placing firm and cooling curds that are undergoing syneresis into a mold. The typical result of the ongoing syneresis is that once the curds are placed in a mold, exiting whey gets trapped by the surrounding curds, with no avenue of escape, forming small pockets or pores where the whey accumulates. With less protein bonds in the void area, a weakness is formed. One method to eliminate pores may include vibrating the molds once the curds are in place and under pressure in an effort to settle the curds closer together while also providing an energetic movement within the mass, allowing more of the whey which is obviously more fluid to escape the gel solids and exit the mold. Vibrating the mold significantly reduces the number of pores, the size of pores, and the weak spots caused by pores.

Introducing seasoning of many types to soymilk may lead a failure of curds to form upon adding the coagulant. This includes seasonings in the form of non-dissolving powders that can block protein bonds. Many seasonings can change the chemical makeup and charges found in soymilk to the extent those chemical changes reduce the amount of curds formed, or the quality of the formed curds. Sodium chloride in sufficient quantity interferes with ionic interactions that cause proteins to bond to make tofu curds or cakes. To achieve the salt level required for traditional pork bacon taste, the exterior of the tofu product may be salt cured or coated (e.g., by dry brining). A dry salt curing process provides control over the amount of salt that is absorbed by the tofu product. In one method, a dry brine may be applied for at least about six hours, at least about eight hours, or at least about 12 hours to equalize into the tofu cake. The tofu product can absorb the entire salt content applied to the tofu product. Salt curing can also provide a key anti-microbial defense. The salt curing of tofu provides an excellent shelf life.

Smoking the tofu-based bacon product may provide a longer shelf life to those products due to the antimicrobial effect. This technique provides a smoked taste without relying on smoke flavoring additives. Both a direct smoke and an indirect smoke can be used to create the bacon-like product. While heat-based smoke, or direct smoke through the heat emitted provides the strongest and most traditional smoke flavor, the heat associated with direct smoke with its combustion occurring inside the smoker box can dry and shrink the tofu-based bacon product, reduce added fats, and cause the individual, pre-sliced strips to stick to each other. The smoke may be made colder by moving the fire outside the smoking enclosure. An external smoke source may yield a fattier, full weight tofu-based bacon product that can be packaged more quickly due to cooler removal temperature and over a reduced duration at a microbial growth temperature or danger zone between 41° F. and 140° F. Cold and/or indirect smoke may be used at one or more stages of the product manufacture. Additionally or alternatively, hot and/or direct smoke may be used at one or more stage of product manufacture.

While certain methods described herein assemble layers of drained curds into a mold layer by layer, heat and pressure bonding can serve as a way to assemble previously prepared tofu layers into the tofu-based bacon product 100, and may provide a means to efficiently mass produce. Under pressure and elevated temperature, one portion of a prepared tofu product can be bonded to another portion of prepared tofu product. For example, separate layers or thin slabs of prepared tofu, each seasoned, colored and formulated differently, can then bonded together under heat and pressure. This bonding process can make it possible to provide high speed, high volume production of the tofu-based product. For example, as shown in FIG. 1, at least two layers of tofu product, for example a first, high fat layer 101, and a second, lean layer 102, may be pressed and heated together to form what now constitutes a single finished tofu-based product for slicing and smoking. The at least two layers may be continuous ribbon-like streams of tofu product. The at least two layers may be extruded or otherwise formed with undulations and/or variations in thickness. The layered product may undergo forced syneresis as described below to minimize pore size and provide a firmer tofu product.

Heating and/or applying pressure to the tofu-based product 100 to ensure homogenization of the fats into the tofu enables the tofu-based product 100 to retain its firmness as well as its sizzle and flavor upon cooking. Extended baking times as well as extensive water drainage from the initial tofu curds force the proteins closer, ensuring a firmer bond. By keeping the baking temperature under 220° F., the fats in the tofu-based product 100 will stay with the proteins and not get expelled with the water. The resulting dense protein and fat rich cake allows for the final product to be sliced thinly and handled without fear of crumbling or breaking the product 100.

The firmness of the tofu-based product 100 is established in part due to an extended duration of pressure in comparison to a standard tofu product. Whereas a typical tofu product is pressed for minutes, the tofu-based product 100 is pressed for hours. Extending the pressing period in an environment with ample drainage for the tofu-based product 100 has produced a firmer cake with fewer pores.

Increased water extraction from the tofu-based product 100 without losing fats in the process has produced a firmer, longer-lasting product. Instead of cooling the tofu in a water bath after being taken from the press as is typical for tofu products, the tofu-based product 100 continues to undergo a water extraction process. The forced syneresis under pressure, followed by a salt cure, reduces the overall water content within the product 100. With a low overall water content, the tofu-based product 100 may be stored in dry conditions, unlike most tofu products which are stored and sold wet.

Figure 2:
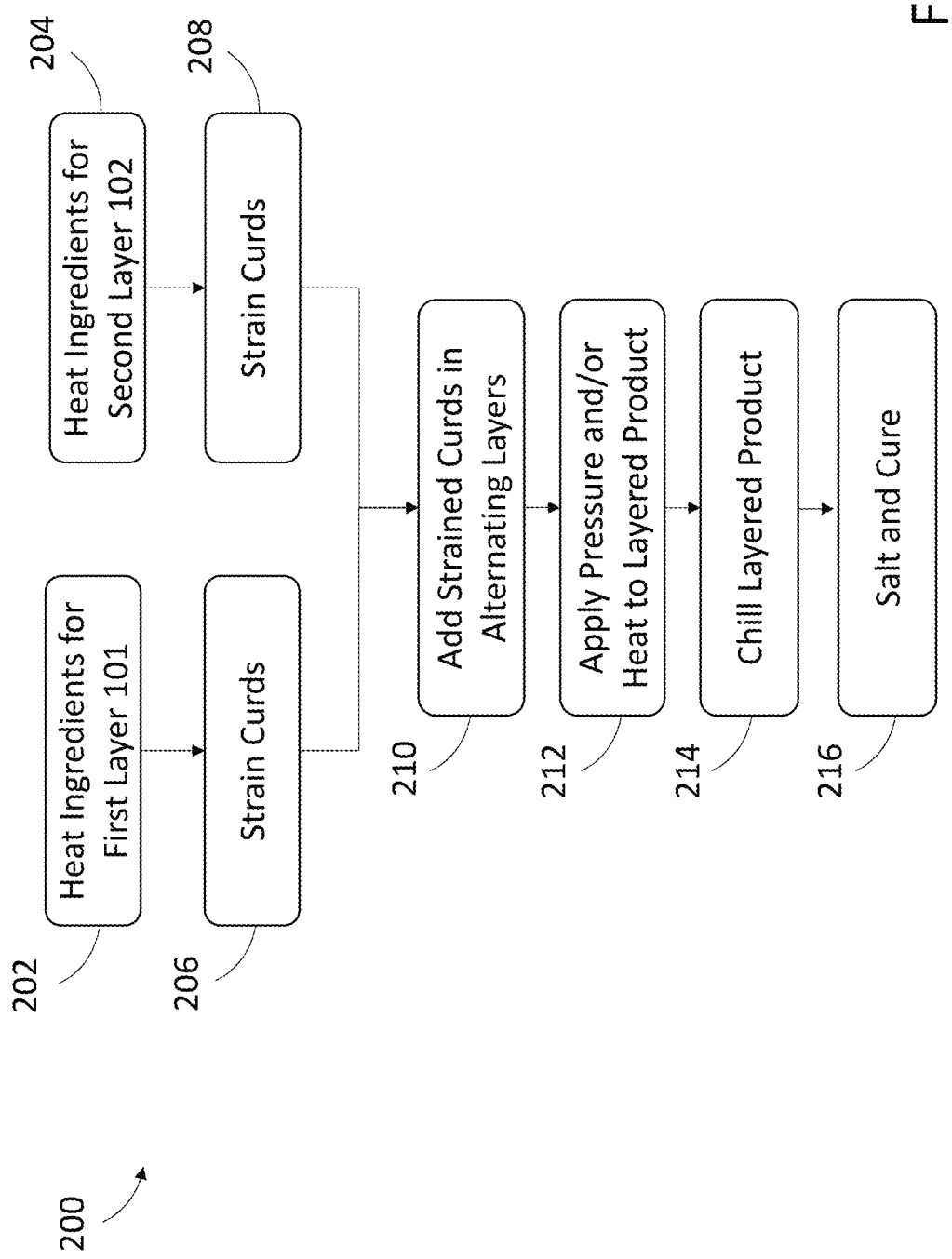
FIG. 2 is a flow chart delineating a process to create a tofu-based product.
Figure 6:
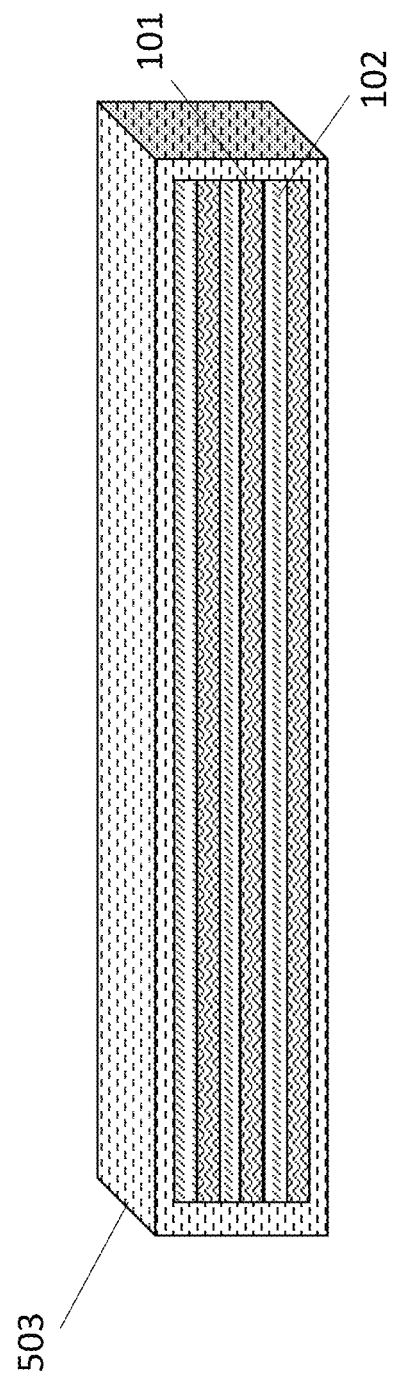
FIG. 6 is a schematic representation of the layering stage of creating the tofu-based product.
Figure 7:
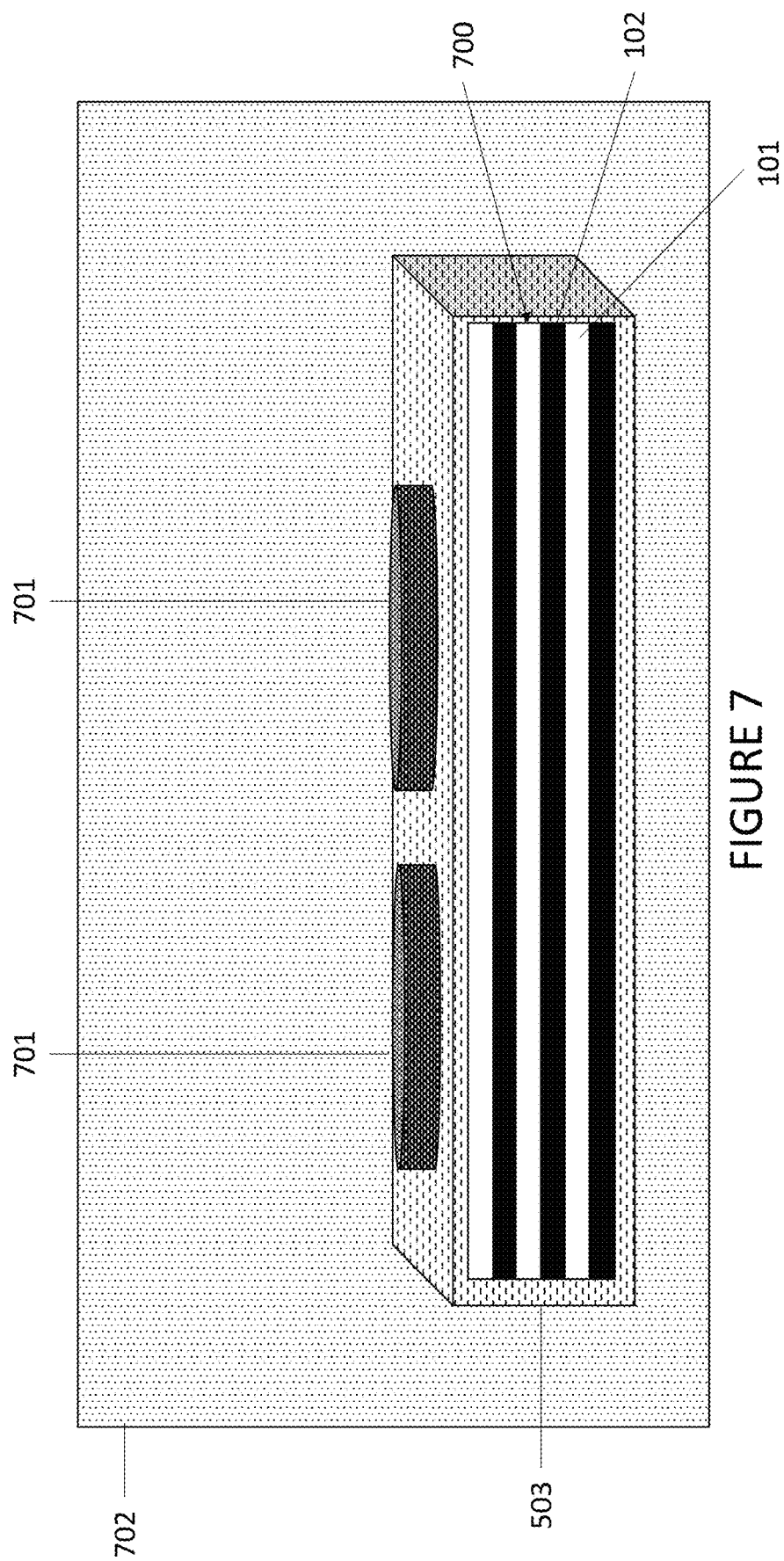
FIG. 7 is a schematic representation of the second heating stage of creating the tofu-based product.
Figure 8:
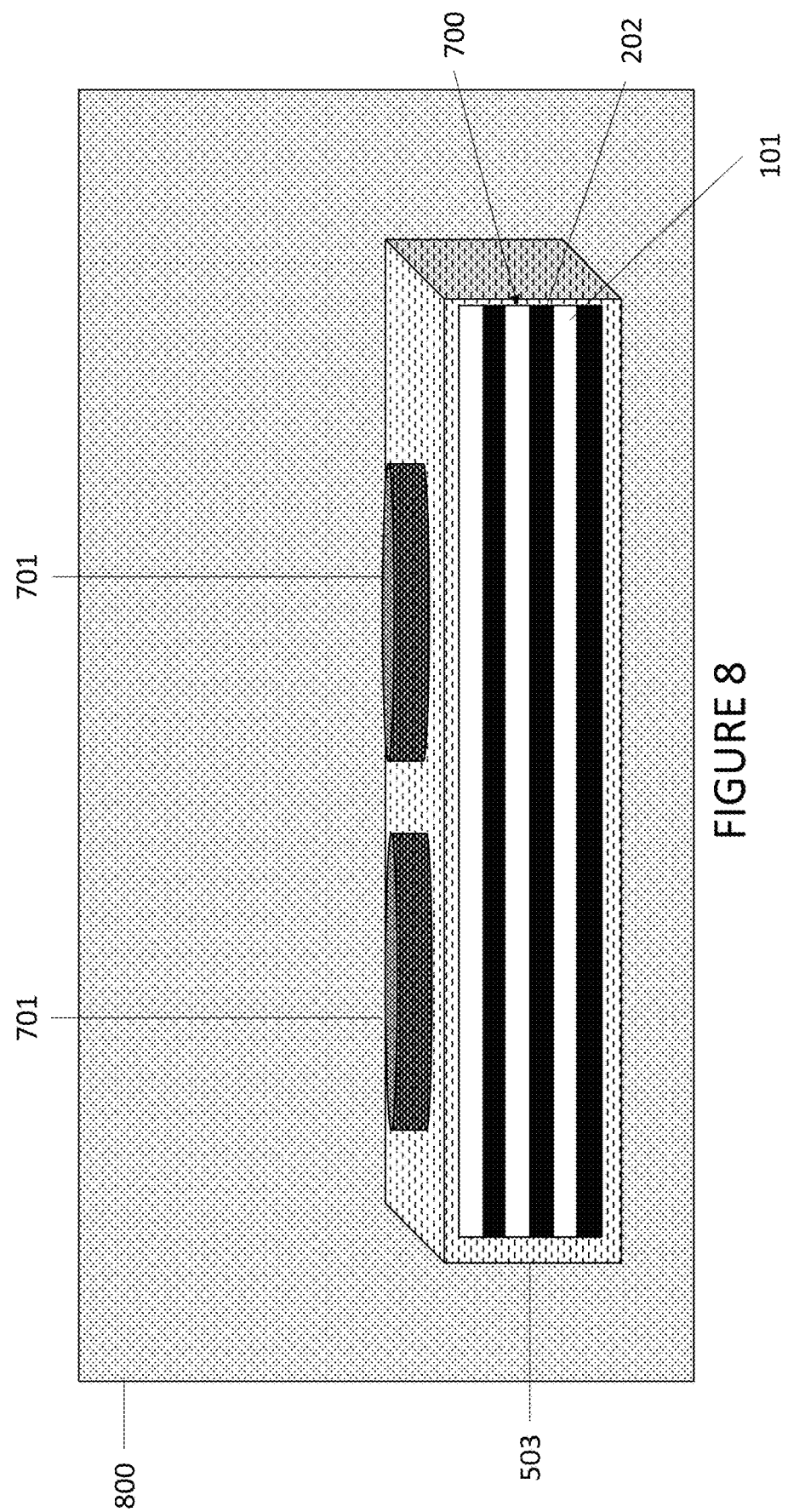
FIG. 8 is a schematic representation of the cooling stage of creating the tofu-based product.

The process 200 for creating the tofu product may include one more of the steps shown in FIG. 2. FIGS. 3-14 schematically illustrate each step of the general process 200. As shown in FIG. 2, in step 202, ingredients for the first layer 101 can be combined in a vessel and heated to homogenize the ingredients (see FIGS. 3 and 4). Optionally, in step 204, ingredients for the second layer 102, can be combined in a vessel and heated to homogenize the ingredients. In steps 206, 208, the curds for each layer can be separately strained (see FIG. 5). In step 210, the strained curds can be provided in alternating layers to form a layered products, for example one, two, or three layers of each of the first layer 101 and the second layer 102 can be layered in alternating order (FIG. 6). In step 212, heat and/or pressure may be applied to the layered product (FIG. 7). This step may be performed in a manner to expel moisture without losing fat content. Thereafter, in step 214, the layered product may be chilled (FIG. 8). In step 216, the layered product may be salted and/or cured (see FIGS. 9 and 10). The salt and curing process may remove additional moisture from the tofu product and increase firmness. The process 200 may exclude one of the above-described steps or include additional steps as detailed in the examples below. The steps may also be performed in a different order.

As described above, the tofu product 100 may include a first, high fat layer 101, and a second, lean layer 102. For example, the first layer 101 may include at least about 80% by weight soy milk and/or less than or equal to about 95% by weight soy milk, or at least about 85% and/or less than or equal to about 90% by weight, for example between 80% to 85%, between 85% to 90%, between 90% to 95%, or numerical values or sub-ranges within these ranges. In some embodiments, the first layer 101 may include about 85.9% to 88.6% by weight soy milk, for example about 86.85%. The first layer 101 may include at least about 5% and/or less than or equal to about 25% by weight fat, for example between about 5% to 10%, between 10% to 15%, between 15% to 20%, such as between 10% to 12% or numerical values or sub-ranges within these ranges. The ratio between soy milk by weight to fat by weight can be at least about 7:1 and/or less than or equal to about 9:1.

The first layer 101 may include at least about 0.1% and/or less than or equal to about 0.5% by weight sweetener (e.g., allulose). For example, the first layer 101 may include less than or equal to about 0.5% by weight sweetener, or less than or equal to about 0.4%, or less than or equal to about 0.3%, or less than or equal to about 0.25%. The first layer 101 may include at least about 0.8% and/or less than or equal to about 2.0% by weight yeast. For example, the first layer 101 may include less than or equal to about 1.0% by weight yeast. The first layer 101 may include at least about 0.5% and/or less than or equal to about 1.5% by weight salt, for example between about 0.5% to 1%, between .75% to 1.25%, between 1.0% to 1.5%. For example, the first layer 101 may include between about 0.8% and 1.0% by weight salt. The first layer 101 may include a coagulant, such as citric acid, of less than or equal to about 0.5% by weight or less than or equal to about 0.25%, for example about 0.02% to about 0.1%.

The second layer 102 may include at least about 90% soy milk by weight, or at least 95%, for example between 96% and 99% or numerical values or sub-ranges within these ranges. The second layer 102 may include no added fat, although in other embodiments, may include at least some fat but less than the fat present in the first layer 101.

The second layer 102 may include at least about 0.1% and/or less than or equal to about 0.5% by weight sweetener (e.g., allulose). For example, the second layer 102 may include less than or equal to about 0.5% by weight sweetener, or less than or equal to about 0.4%, or less than or equal to about 0.3%, or less than or equal to about 0.25%. The second layer 102 may include less than or equal to about 2.0% by weight yeast, less than or equal to about 1.5%, or less than or equal to about 1.0%, for example between about 0.5% and 1.0% or between about 1.0% and 1.5%. The second layer 102 may include at least about 0.1% and/or less than or equal to about 1.5% by weight salt, for example about 0.3% to about 1.1% or about 0.5% to about 1%, such as about 0.75%. The second layer 102 may include a coagulant, such as citric acid, of less than or equal to about 0.5% by weight or less than or equal to about 0.25%, for example about 0.02% to about 0.1%. The second layer 102 may include an added food colorant of less than or equal to about 1.0% by weight or less than or equal to 0.5%, for example about 0.2% to about 0.8%, about 0.2% to about 0.5%, such as about 0.3%.

EXAMPLE 1

Tofu-Based Bacon Product

Alterations and variations to ingredients and method may be made to this example in order to change the volume, qualities of the product either slightly or to create a new product based on the enriched and seasoned, molded tofu curd invention. The basic process to create a tofu-based bacon product are shown in FIG. 2.

The first layer 101 may include: 4 gals soy milk, 1800 grams palm oil fat, 175 chicken yeast, and 40 grams allulose. The second layer 102 may include: 5 gallons soy milk, 60 grams IFC Warm Red, 225 gms SM yeast, and 40 gms allulose. Additional ingredients may include 2 Tbsp. citric acid, 150 grams salt divided into three 50 gram batches, 90 gram (6 Tbsp.) maple syrup, and/or 60 grams coarse ground pepper.

To begin, the ingredients are assembled. The oven is preheated to a temperature of less than or equal to 220° F. or less than or equal to 200° F. Perforated mold pans may be provided with rippled screens and linen or cheesecloth.

As shown in FIG. 3, the first layer ingredients may be added to vessel 301 and the second layer ingredients may be added to vessel 302. Soy milk may be the last ingredient to provide seasoned soymilk. The large vessels 301 and 302 may be heated, for example on burners 400, as seen in FIG. 4. The ingredients may be mixed for each layer in separate vessels with soy milk in preparation to make the tofu-like product. Many ingredients either in any amount or beyond certain amounts described herein can limit curdling of soy milk into tofu.

When the fat is melted, an immersion blender or any high-speed shear device may be used to homogenize fat into the first layer so that no fat droplets can be perceived in the liquid in vessel 301, for example for at least one minute. The ingredients in each vessel 301 and 302 may be heated to at least 165° F., for example approximately 180° F., while stirring frequently, and then eliminate the heat. Homogenization of fat into soy milk allows the tofu-based product 100 to fry in its own fat and increases shelf life.

The second or lean layer in vessel 302 may include a colorant, for example radish and paprika based, to mimic the natural color of pork-based bacon and prevent color bleeding, but other colorants are possible. Adding in the food coloring to the other ingredients in vessel 302 in this step before curdling may be desirable to ensure complete color penetration in the tofu product. If food coloring is added in steps after the curdling has occurred, the color may not penetrate into the curd beyond the first millimeter. By adding in the food coloring before the curds form, the color penetrates fully into each curd.

Although this example calls for allulose, other sweeteners may be used, for example other non-glycemic sweeteners or natural sweeteners.

After the mixtures have been heated to the desired temperature, the mixtures in vessels 301 and 302 may be cooled to less than or equal to about 170° F. and allowed to coagulate. A coagulant may be provided, such as citric acid, to facilitate coagulation. For example, four cups water made up with 2 TBSP citric acid may be distributed equally across both vessels. Curdling using citric acid instead of traditional coagulants can increase flavor and extends shelf life. The mixtures may be slowly stirred allowing dense curds and clear whey to form.

Figure 5:
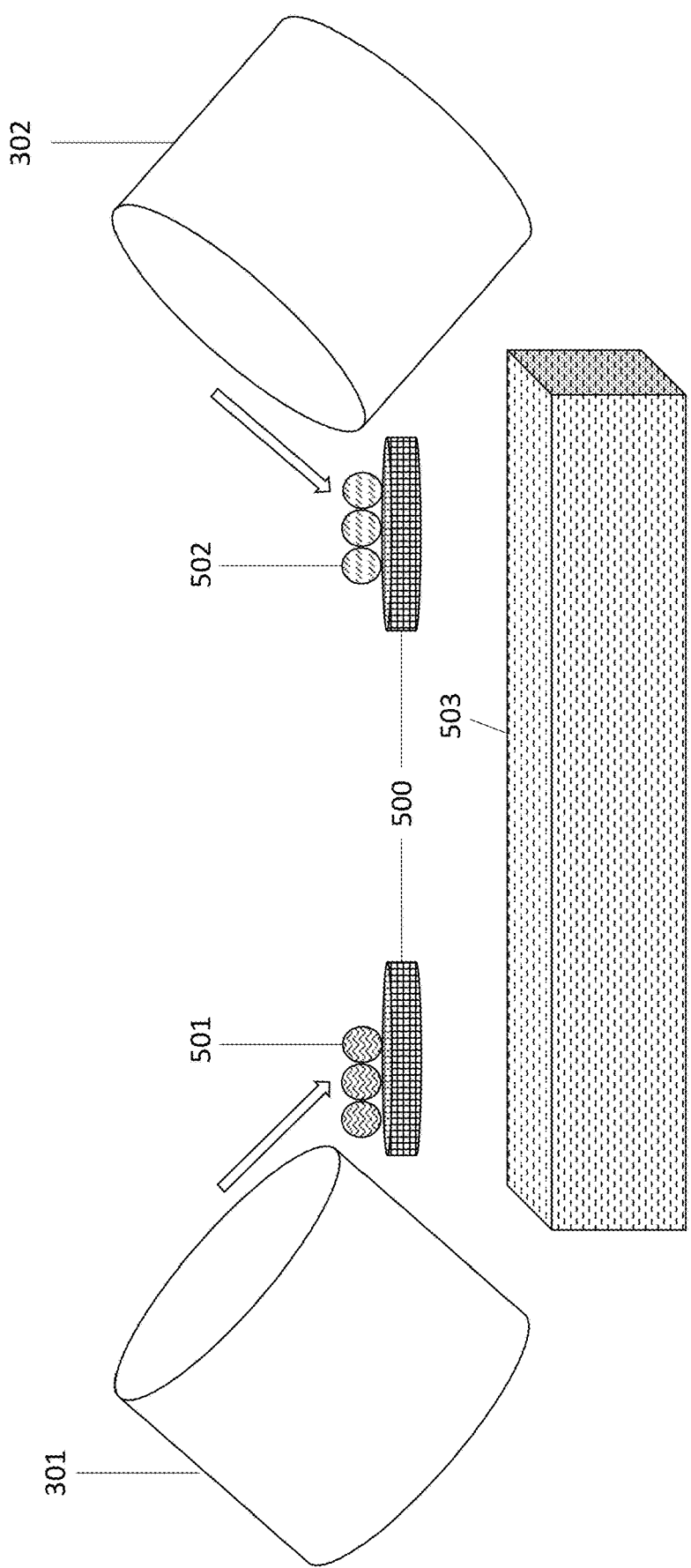
FIG. 5 is a schematic representation of the straining stage of creating the tofu-based product.

As shown in FIG. 5, the curds may be placed in a mold pan 503, for example a perforated pan sized to provide a tofu cake that is easily cut into strips with no waste. The mold pan 503 may include drop-in shaping screens, for example rippled stainless steel shaping screens that provide the mold a rippled surface to each side of the tofu-based product 100 in each bottom. A large section of linen or cheesecloth may be placed into each mold pan 503. Curds 501, 502 may be sieved through sieves 500 as shown in FIG. 5 and when drained of visible whey, placed into mold pan 503. With a layered product, the layers 101, 102 may be added in alternating order as seen in FIG. 6. The straining step prevents the different layers from mixing together as well as reduces trapped moisture that can form pores in the finished product. Water extraction in the straining stage is important for the overall texture and shelf life of the tofu-based bacon product 100, as unlike other tofu-based products which are sold wet and drained extensively before use, the tofu-based product 100 is packaged and sold dry. Water extraction from the tofu-based product 100 helps ensure that the shelf life is extended, the product cooks and sizzles as real bacon would, and the user can immediately cook the product without having to go through extensive draining processes. The layered product may be smoothed with a spatula.

Combining the two separately flavored layers 101, 102 in this manner shown in FIG. 6 mimics the look, the texture and general appeal of traditional pork. To form a rippling effect, the cheesecloth may be folded to cover the product and a rippled screen may be placed on top. Pressure or weight may be applied on top of the rippled screen. The layering process may include adding in one layer at a time or simultaneously layering, for example with an extrusion process.

As shown in FIG. 7, pressure or weight may be applied in the form of portable weights 701. The weights 701 may be at least 10 pounds, at least 15 pounds, or at least 25 pounds. Once the weights 701 are in place, vibration may be applied on all sides of mold using an electric motor or by vigorously rap the pan repeatedly on all sides. This may take place for at least 30 seconds per side to settle curds in together closer to eliminate voids created by curds and whey separation in mold.

After vibration, additional whey may be drained from the layered product, in some examples, for approximately twenty to thirty minutes until most dripping has ceased. The vibrations reduce naturally-occurring tofu "pores" to look more like traditional bacon, increase durability, and reduce breakage of strips.

Once the whey has been drained, mold pan 503 may be placed in the oven 702 with the weights 701 and heated to a predetermined temperature of no more than 200° F. or no more than 220° F. (see FIG. 7). A pan may be provided underneath to catch whey that may escape. The tofu product may be kept at that predetermined temperature for at least one hour, at least two hours, or at least three hours. During this heating process, pressure or weight may be maintained on the tofu product. In this stage, the maximum temperature in the oven 702 should be limited to approximately 220° F. The high but regulated heat in the oven 702 ensures that water is efficiently removed from the layers 101 and 102 in the tofu cake 700 while keeping the proteins and fat together within each layer 101 and 102. Heating the tofu cake 700 higher than 220° F. runs the risk of separating the fat from the protein in each of the layers 101 and 102. Heating the tofu cake 700 below 200° F., while ensuring that the protein and fat in each of the layers 101 and 102 do not separate, greatly increases the overall time to remove remaining moisture in this stage.

Once the molds have completed heating sequence and forced syneresis is complete, the mold pan 503 may be tilted to drain any liquid which may have accumulated and not drained.

The mold pan 503 may be removed from the oven 702, and the weight or pressure may be removed. The mold pan 503 may be placed into the blast chiller 800 for at least about 30 minutes as shown in FIG. 8. Chilling to an internal temperature of approximately 40° F. allows the tofu cake 700 to firm such that the tofu cake 700 may be removed from the mold pan 503 without damaging (e.g., tearing) the tofu-based product 100. The chilled tofu cake 700 may be released by inverting the mold pan 503 onto a flat sheet, and then the convoluting screens and cheesecloth may be removed.

Figure 9:
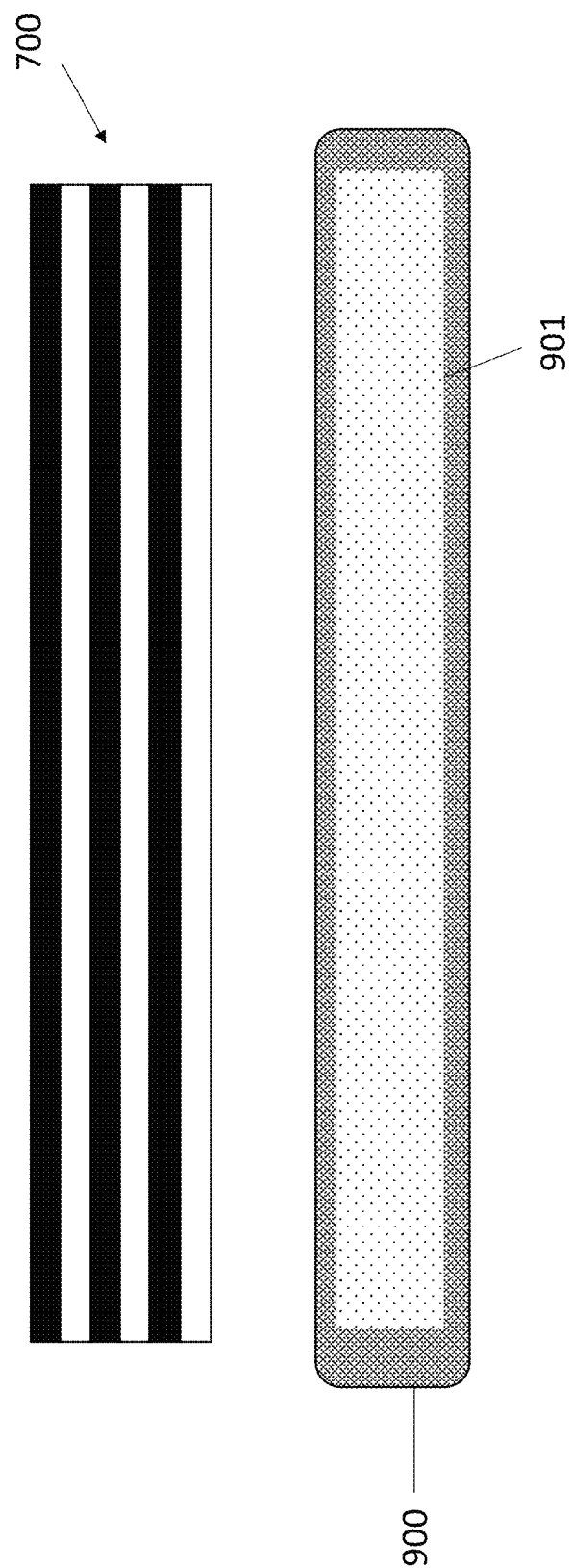
FIG. 9 is a schematic representation of the salt curing stage of creating the tofu-based product.
Figure 10:
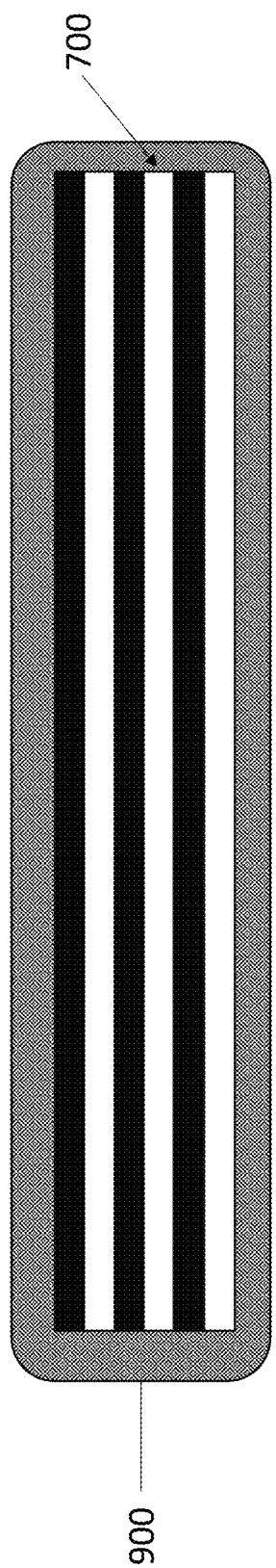
FIG. 10 is a schematic representation of the tofu-based product wrapped in plastic.

As shown in FIG. 9, plastic wrap 900 may be laid onto a flat surface and sprinkled with 25 grams of salt 901 as shown in FIG. 9. The cooled tofu cake 700 may be placed onto the salt and topped with remaining 25 grams of salt 901. The plastic wrap 900 may be wrapped securely around the tofu cake 700 as shown in FIG. 10 and placed into the refrigerator for at least one hour (or at least 6 hours, or at least 8 hours, or at least 12 hours) to absorb salt 901 completely and allow equalization of salt concentration throughout the tofu cake 700. The salt curing improves taste and increases firmness and shelf life. Chilling to 40° F. not only reduces the possibility of microbial growth, keeping the food product within safe temperature zones, but also allows the firmness required very thin slicing (5 mm).

Figure 11:
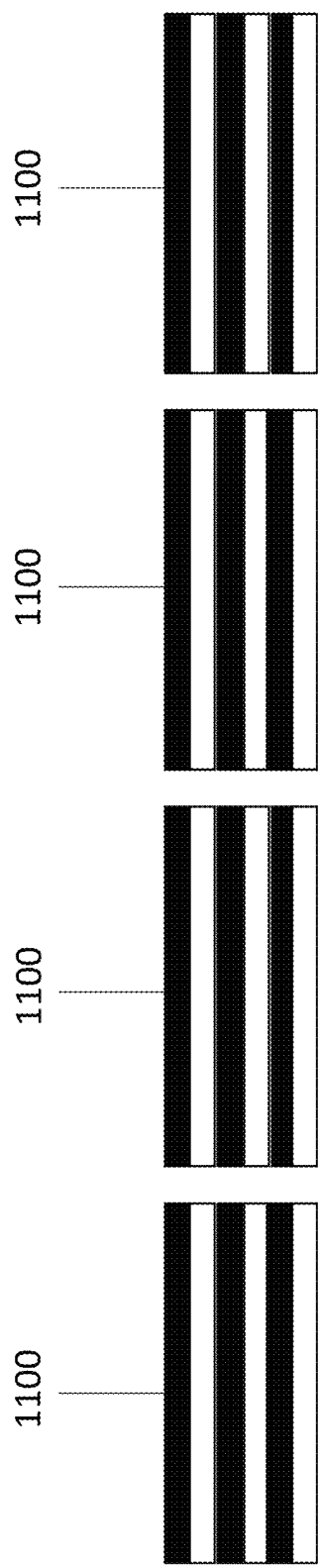
FIG. 11 is a schematic representation of the cut tofu-based product.
Figure 12:
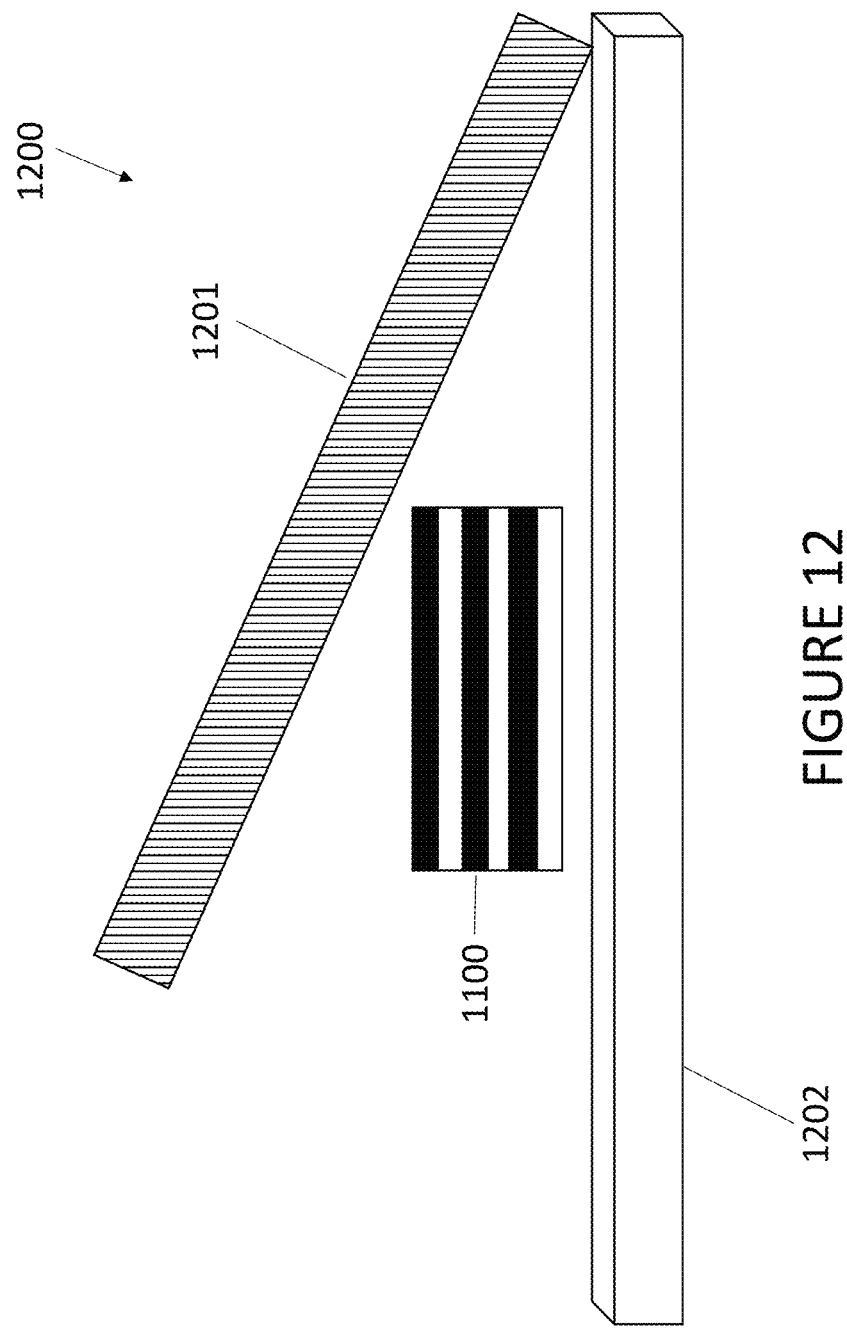
FIG. 12 is a schematic representation of the cut tofu-based product being sliced.

After the salt 901 is absorbed into the tofu cake 700, the tofu cake 700 may be unwrapped. The tofu cake 700 may be divided into multiple pieces 1100 as shown in FIG. 11. Each piece 1100 may then be sliced, for example using a slicer 1200, as shown in FIG. 12. A wire type "guitar" slicer 1200 made up of a base 1202 with deep elongated channels may be set at a desired thickness, for example 5 mm, and a pivoting frame arm 1201 with wires spaced correspondingly to the desired thickness may be used wherein a piece 1100 is sliced by bringing the pivoting frame arm 1201 down over and through the piece 1100. The cutter may have a low fulcrum, such that the fulcrum point is significantly lower than the product to be cut. In this way, the cutter approaches the cake at a more vertical angle, which allows the cutter to cut less of the cake at one time, reducing resistance and friction through the cake which can damage the cake and slices so that they cannot be used (sold). If the cutter moves horizontally through the cake, the resistance from the wires engaging or cutting the cake may break the cake. 5 mm super thin slicing mimics the look and texture of traditional bacon. For mass production, a sonic slicer and computer/servo-controlled conveyer belts may be used to slice the cake one slice at a time, but in a rapid and efficient robotic manner without damage to slices. This sonic blade and conveyor belt system can also provide a layout of slices that would be too labor intensive if performed by human hands.

The sliced cakes 1300 may be moved onto a smoker grill. For example, the resultant sliced cakes 1300 may be placed on a wire smoker rack without allowing it to separate into individual slices or strips. Any partial slices can be removed. This process continues until the smoker rack has been filled. Pre-slicing before smoking can be an important step because post-smoking the exterior of the strips can become toughened and difficult to slice at 5 mm thickness without damaging the entire portion as the pressure causes cleavage.

Figure 13:
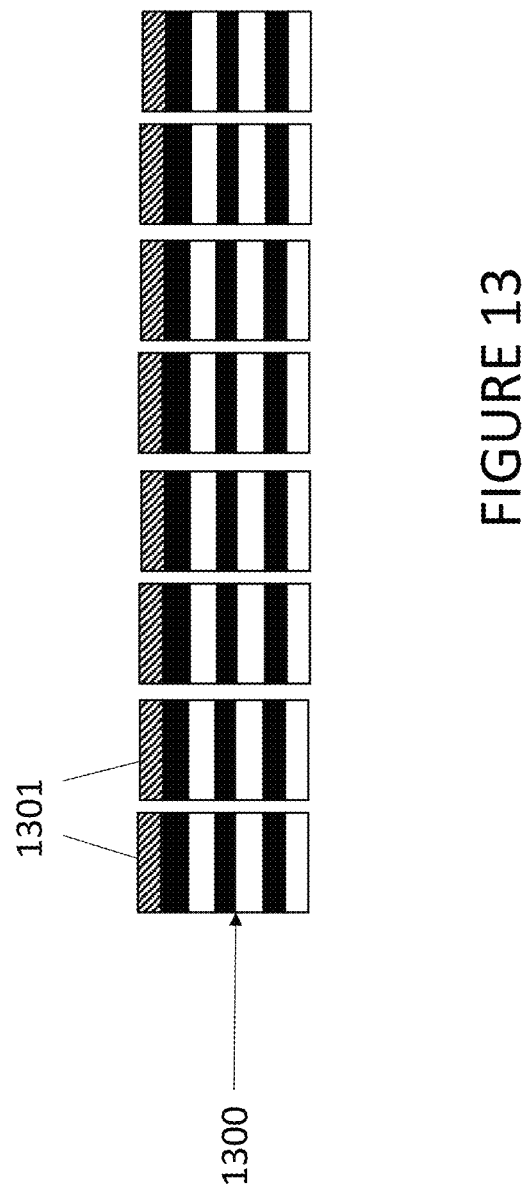
FIG. 13 is a schematic representation of the tofu-based product being seasoned.

In FIG. 13, the sliced cakes 1300 may be topped with additional seasoning 1301, such as maple syrup and/or black pepper, so that the product glistens evenly. The sliced cakes 1300 may be evenly covered with a layer of coarse black pepper. Layering with maple syrup and coarse cracked pepper, increases flavor and extends shelf life.

As shown in FIG. 14, racks 1402 with sliced cakes 1300 may be cold and/or hot smoked in smoker 1403 for at least one hour (or at least two hours or at least three hours) at a medium level of hardwood smoke as shown in FIG. 14. Cold smoke may be produced by an indirect combustion of wood particles outside of the smoker box. "Hot" smoke, which can elevate the product temperature, may be achieved by combustion within the smoker box. Smoking, either cold or hot, increases flavor and extends shelf life. Cold smoking can prevent the drying and sticking together of sliced strips that may occur from hot smoking. Hot smoking may be utilized where a strong flavor is paramount, such as in whole uncut sides or cubed "lardons".

In one examples, the racks 1402 may be loaded with sliced cakes 1300 into a cold smoker employing hardwood such as hickory, mesquite or pecan wood for example in chips, chunks or pellets and employ a thick smoke for at least three to six hours, hot and/or cold, depending on the level of smoke in flavor brand such as "smoked" or "double smoked".

After smoking, the sliced cakes 1300 may be removed from the smoker and wrapped in plastic to cover completely. The wrapped sliced cakes 1300 may be cooled in the refrigerator until the internal temperature of the slices reaches less than or equal to about 40° F. This may take at least one hour.

After chilling, the sliced cakes 1300 may be portioned and packaged in vacuum chamber bags without any additional marinade, water, or other fluid. The packages may be affixed with FDA required labeling and marked with batch number and best by date unless going into freezer, in which case those packages will receive a different best by date prior to shipment.

In order to package the tofu-based bacon product, a plastic wedge like a pastry scraper may be employed to separate the smoked and sliced slabs into portions. Once separated from the slab, the portion may be weighed to assure it is the desired portion and may then be placed into an elevated packaging "shoe" consisting of a platform with two walls on each side and an open top, shaped wide enough to hold the width of the portioned product, and long enough to hold the length of that portioned product plus two inches of taper that cause a vacuum sleeve to open as it is pushed along the shoe to surround the portion. Once the vacuum sleeve is in place surrounding the portion, the portioned product may be pushed out of the shoe along with the vacuum sleeve and is ready for sealing in a vacuum chamber. Each package of the tofu-based bacon product may be packed dry, unlike other tofu-based products. Packing each tofu-based bacon product package dry assures that the tofu-based bacon product will have an extended shelf life, and it will aid in reducing sputtering or splattering while cooking the tofu-based bacon product.

The packaged portions of the tofu-based bacon product can be kept at room temperature for at least four days without any detectable significant growth and at refrigerator temperatures have gone at least two weeks so far with zero growth.

EXAMPLE 2

Contents by Percent Mass of a Sample of Tofu-Based Bacon Product

TABLE 1

Tofu-Based Bacon Product Contents by Percent Mass

| Test | Unit | Result | Method |
|---|---|---|---|
| Fat Total: Soxhlet | % | 18.01 | LT6023 |
| Moisture | % | 63.45 | LT6026 |

TABLE 1-continued

Tofu-Based Bacon Product Contents by Percent Mass

| Test | Unit | Result | Method |
|---|---|---|---|
| Protein: Kjeldahl | % | 13.1 | EPA Method 8270 |
| NaCl Content | % | 2.08 | LT6034 |
| Water Activity | — | 0.9744 | LT6042 |

The overall contents of a specific sample of the tofu-based product 100 determined by a test in an independent lab are shown in Table 1. Using the LT6023 method, the overall fat content of a specific sample of the product 100 was determined to be 18.01% by mass. With the LT6026 method, the moisture content was determined to be 63.45% by mass of a specific sample of the product 100. Using the EPA method 8270, a specific sample of the tofu-based product 100 was found to have 13.1% protein by mass. The sodium chloride content of a specific sample of the product 100 was determined to be 2.08% by mass using the LT6034 method. The overall water activity was determined to be 0.9744 utilizing the LT6042 method for a specific sample of the product 100.

The ratio of fat to protein in the tofu-based product 100 may range from at least about 1:1 and/or less than or equal to about 2:1, for example between 1.2:1 to 1.6:1 or ratios or sub-ranges of ratios between those ranges. The ratio of moisture to fat in the tofu-based product 100 may range from approximately at least about 2:1 and/or less than or equal to about 5:1, for example between about 3:1 to 4:1 or ratios or sub-ranges of ratios between those ranges. The moisture to protein ratio in the tofu-based product 100 may range from at least about 2:1 and/or less than or equal to about 6:1, for example between about 3:1 and about 4:1, between about 4:1 and about 5:1, or ratios or sub-ranges of ratios between those ranges. The ratio of fat to salt in the tofu-based product 100 may range from at least about 6:1 and/or less than or equal to about 10:1, for example between about 6:1 to 8:1, between about 8:1 to about 10:1, or ratios or sub-ranges between those ranges. The ratio of protein to salt in the tofu-based product 100 may range from at least about 4:1 and/or less than or equal to about 8:1, for example between about 4:1 to 6:1, between about 6:1 to about 8:1, or ratios or sub-ranges between those ranges. The ratio of moisture to salt in the tofu-based product 100 may range from at least about 25:1 and/or less than or equal to about 35:1, for example between about 25:1 to about 30:1, between about 30:1 to about 35:1, or ratios or sub-ranges between those ranges.

In one example, the tofu-based product 100 may have a fat to protein ratio of approximately 1.4 to 1. The tofu-based product 100 may have a moisture to fat ratio of approximately 3.5 to 1. The tofu-based product 100 may have a moisture to protein ratio of approximately 4.8 to 1. The tofu-based product 100 may have a fat to salt ratio of approximately 8.7 to 1. The tofu-based product 100 may have a protein to salt ratio of approximately 6.3 to 1. The tofu-based product 100 may have a moisture to salt ratio of approximately 30.5 to 1.

Other Food Products

Although the examples described herein are specific to a bacon substitute, the processes and compositions can also be used to provide other food products, including but not limited to animal substitute products such as pork belly both smoked and unsmoked, sliced, unsliced, thick sliced, whole sides or cut into lardons, flavors could include original hickory smoked, other smoke flavors, variations on maple, brown sugar; pork analogs such as smoked ham with fatty exterior, a canned pork-like lunch meat, a chorizo analog, taco meat and other grinds such as sausages both fresh and cured, all made with our high fat/low fat, meat flavored tofu invention; chicken analogs complete with three dimensionally printed starch based bones; chicken fried steak analogs; smoked and unsmoked tofu jerky; Texas vegan chili; desserts; whipping creams; soy creamers; okra tempeh patties; and vegan meaty seasonings.

Any of the methods described herein may be used to create a food colored, seasoned and fat enriched tofu. For example, the methods may be used to pre-season and/or enrich soy milk prior to coagulation, which can be more efficiently than post curdling. The methods described herein may be used to enrich soymilk prior to curdling to add fats and flavors and sweeteners to soy milk so that it coagulates in a mold as a finished jelly-like dessert of great creaminess of texture and delicious flavor.

Terminology

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Although certain embodiments and examples have been described herein, it will be understood by those skilled in the art that many aspects of the tofu-based products shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±1%, ±5%, ±10%, ±15%, etc.). For example, "about 10%" includes "10%".

What is claimed is:

1. A process for making a layered tofu bacon product comprising:
    forming a first fatty layer of tofu bacon product, wherein forming the first fatty layer comprises homogenizing a mixture of soy milk and added fat prior to curdling, the first fatty layer comprising at least 12% fat;
    forming a second lean layer of tofu bacon product, the second lean layer having soy milk, a red colorant, and no added fat; and
    layering the first fatty layer and the second lean layer to form the layered tofu bacon product.

2. The process of claim 1, wherein one or more flavoring ingredients are added to the mixture of soy milk and added fat prior to curdling.

3. The process of claim 1, further comprising applying vibration to one or more of the first fatty layer and the second lean layer.

4. The process of claim 1, further comprising, after layering the first fatty layer and the second lean layer, applying pressure to the layered tofu bacon product.

5. The process of claim 1, further comprising, after layering the first fatty layer and the second lean layer, applying heat at a temperature no more than 220° F.

6. The process of claim 1, further comprising applying dry salt to an external surface of the layered tofu bacon product.

7. The process of claim 1, wherein the first fatty layer comprises at least 18% fat.

8. The process of claim 1, wherein homogenizing the mixture comprises applying a shear force to the mixture.

9. The process of claim 1, wherein the first fatty layer and the second lean layer are different colors.

10. The process of claim 1, further comprising packaging the layered tofu bacon product without any additional liquid.

11. The process of claim 1, wherein the red colorant is paprika or radish.

12. A process for making a layered tofu product comprising:
    combining soy milk, added fat, and one or more flavoring ingredients to create a first mixture;
    applying a shear force to the first mixture until the first mixture is homogenous;
    curdling the first mixture;
    forming a first fatty layer of tofu product from the first mixture, the first fatty layer comprising at least 12% fat;
    combining soy milk, a red colorant, and one or more flavoring ingredients to create a second mixture;

forming a second lean layer of tofu product from the second mixture;

applying vibration to one or more of the first fatty layer and the second lean layer;

layering one or more first fatty and second lean layers to form the layered tofu product;

applying pressure to the layered tofu product;

applying heat to the layered tofu product at a temperature no more than 220° F.; and applying dry salt to an external surface of the layered tofu product.

13. The process of claim 12, further comprising packaging the layered tofu product without any additional liquid.

14. The process of claim 12, wherein the first fatty layer comprises at least 18% fat.

15. The process of claim 12, further comprising adding different types of yeast to the first fatty layer and the second lean layer.

16. The process of claim 12, wherein the first fatty layer and the second lean layer are different colors.

17. The process of claim 12, further comprising indirectly applying smoke to the layered tofu product at a temperature of less than or equal to 200° F.

18. The process of claim 12, wherein the red colorant is paprika or radish.

* * * * *